(No Model.) 2 Sheets—Sheet 1.

L. MELCHIOR & G. HAAS.
SPRING MOTOR.

No. 407,939. Patented July 30, 1889.

WITNESSES:
Fred G. Dieterich
P. B. Turpin

INVENTOR:
Ludwig Melchior
George Haas
BY
ATTORNEYS.

(No Model.) 2 Sheets—Sheet 2.

L. MELCHIOR & G. HAAS.
SPRING MOTOR.

No. 407,939. Patented July 30, 1889.

WITNESSES:
Fred G. Dieterich
P. B. Turpin

INVENTOR:
Ludwig Melchior
George Haas
BY
ATTORNEYS.

UNITED STATES PATENT OFFICE.

LUDWIG MELCHIOR AND GEORGE HAAS, OF WILMINGTON, DELAWARE.

SPRING-MOTOR.

SPECIFICATION forming part of Letters Patent No. 407,939, dated July 30, 1889.

Application filed April 19, 1889. Serial No. 307,635. (No model.)

*To all whom it may concern:*

Be it known that we, LUDWIG MELCHIOR and GEORGE HAAS, of Wilmington, in the county of New Castle and State of Delaware, have invented a new and useful Improvement in Spring-Motors, of which the following is a specification.

This invention is an improved spring-motor; and it consists in certain novel constructions and combinations of parts, as will be described, and pointed out in the claims.

Figure 1:
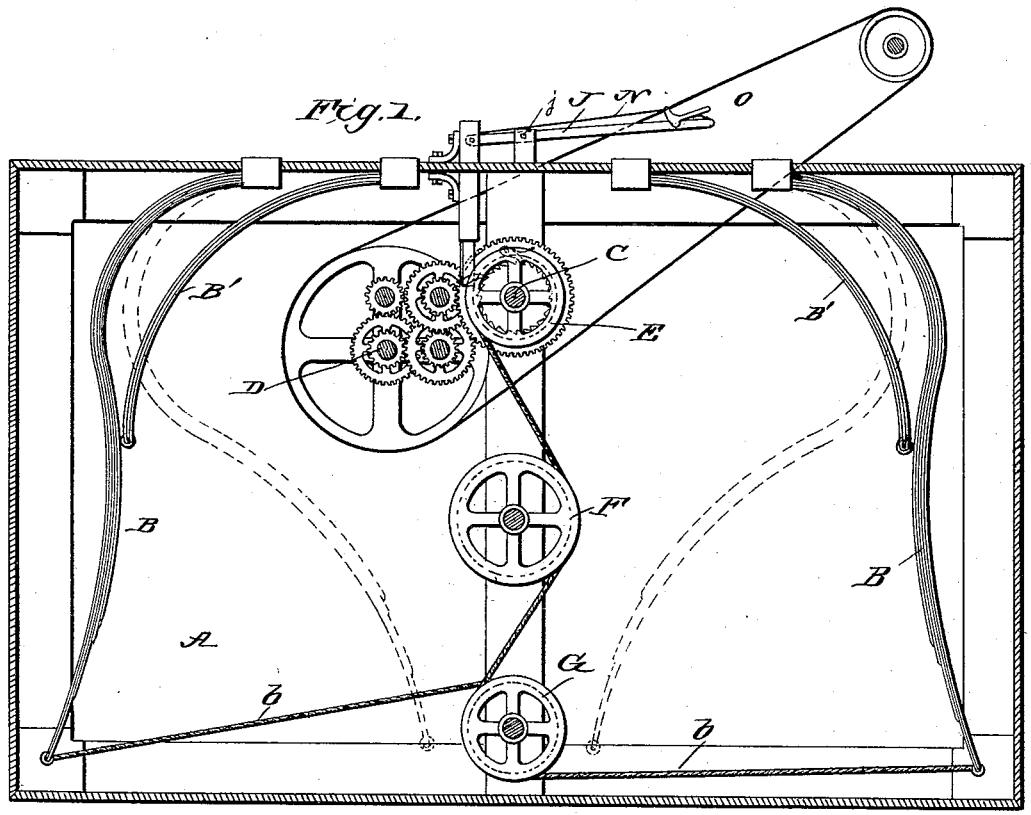
Figure 2:
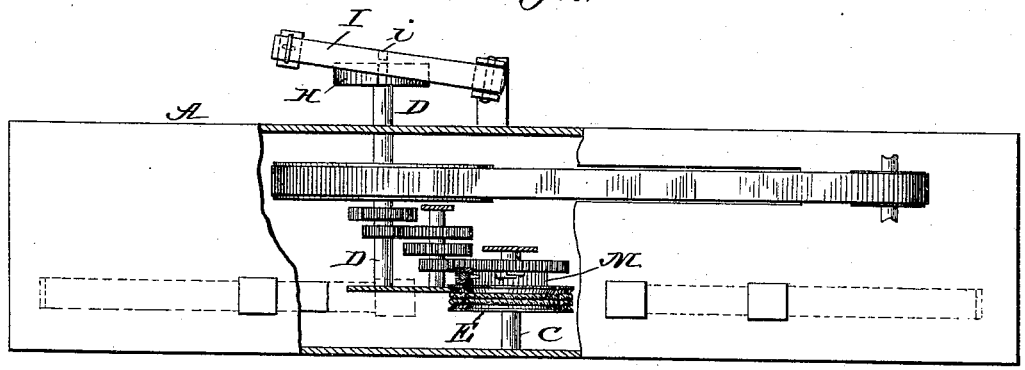
Figure 3:
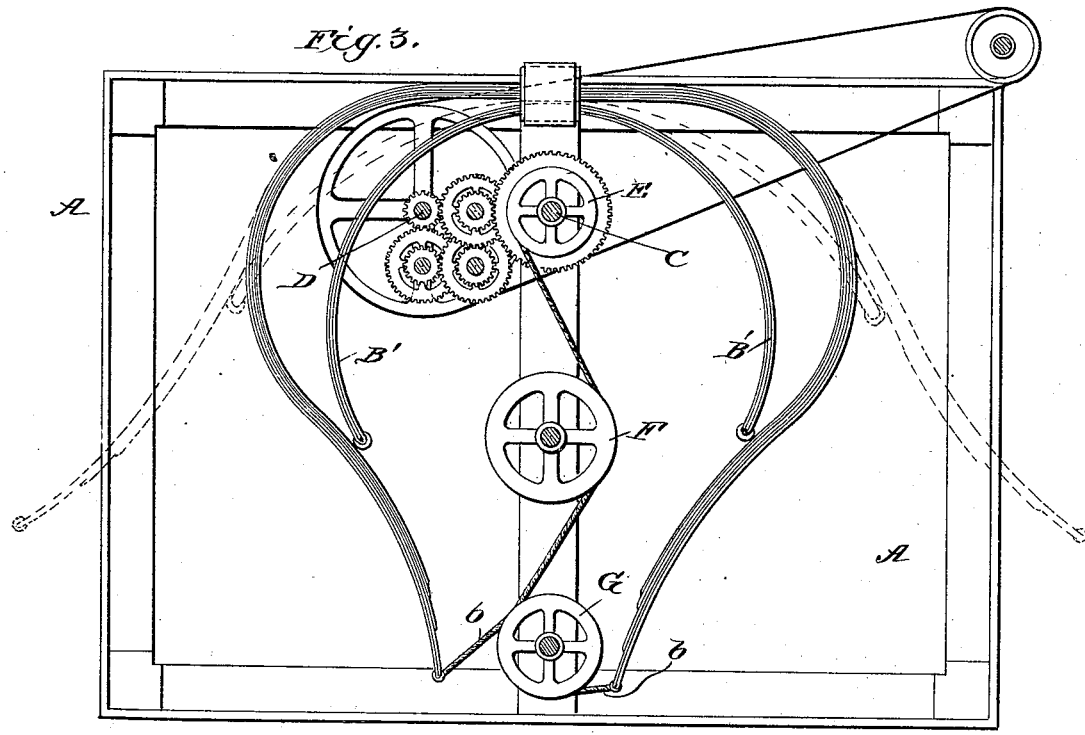
Figures 4, 5:
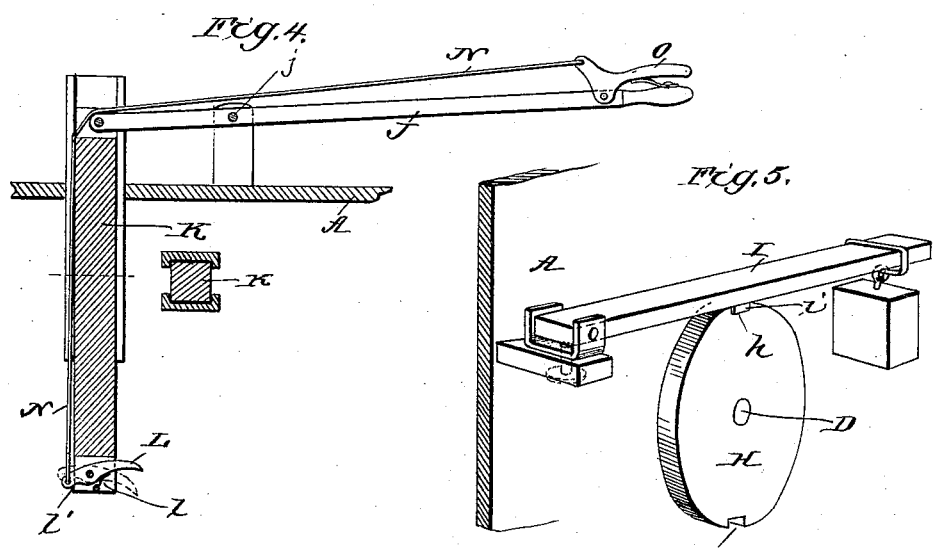

In the drawings, Figure 1 is a side view, and Fig. 2, a top plan view of our improved motor. Fig. 3 is a side view showing a somewhat different construction. Fig. 4 is a detail view illustrating the winding mechanism, and Fig. 5 is a detail view illustrating stop and brake mechanism.

The supporting-frame A may be of any suitable construction to provide supports for the bearings of the several shafts hereinafter described. To the frame A we secure the operating-springs B B, which may be separated arms, as shown in Fig. 1, or be the extended arms of a single spring-bar, as shown in Fig. 3.

The shafts C D will be denominated, respectively, the power and the drive shafts, because the power of the springs is applied to shaft C and the mechanism to be driven by the motor is geared or connected with the shaft D. Suitable intermediate gearing is provided to multiply the speed, as will be understood from the drawings, but manifestly the mechanism to be driven might be connected directly with the power-shaft when so desired.

The spring-bars B are secured at one end to the framing, and may preferably be formed of a number of leaves or plates, as shown. To the outer or free ends of the spring-arms or main springs we secure the cords or ropes or chains *b*, by which connection is established between the springs and the power-shaft in order to enable such springs when flexed to revolve such power-shaft, as desired. Chains instead of ropes may be used when desired.

In connecting the cords or ropes *b* with the power-shaft, we prefer to provide the latter with a drum E, secure the cords *b* thereto, and direct such cords around pulleys F and G in their passage to the free ends of the spring-arms. When the motor is wound up, the free ends of the spring-arms are drawn up close to the lower guide-pulley G. It will be seen that the tension of the spring-arms will operate to revolve the power-shaft until such arms assume their normal relaxed position, as shown in full lines, Fig. 1, and indicated in dotted lines, Fig. 3.

It will be seen that a powerful tension is thus exerted to revolve the power-shaft and to operate such parts as may be connected or geared therewith. Where desired, the spring-arms on opposite sides of the machine may be multiplied to any desired extent, so increasing the power to be applied.

While the construction of springs, as described, may give good results, we prefer to use in connection therewith shorter spring-bars, forming auxiliary springs B', secured at one end rigidly to the framing and arranged at their other ends to bear against the inner sides of springs B, between the ends of the latter and preferably about midway of such ends, the springs B' being preferably provided at such free ends with rollers $b'$ to press against springs B. This construction is especially desirable, as the springs B' increase the power of the machine and serve an important purpose in operating to prevent fracture of the springs B in drawing same up in the winding of the machine.

The mechanism to regulate or govern the speed of the motor may be of any suitable form, and we do not desire to be restricted to any specific construction of the governing mechanism.

In the construction shown the shaft D is extended and is provided with a pulley H, having a notch or notches *h*, and a brake-lever I is arranged to bear against such pulley and may be weighted to any desired degree. This lever is pivoted so it may be adjusted laterally to a limited extent and is provided at one side with a tooth or lug *i*, which may be adjusted into the notch *h* of pulley H when it is desired to stop the motor.

To wind the motor, we provide a hand-lever J, pivoted at *j* and provided with a link or bar K, bearing a pawl L, which engages the ratchet-wheel M on the shaft C. This pawl L is actuated by a spring $l$, which operates to hold the pawl normally clear of wheel M, while in rear of its pivot the pawl L has an extension $l'$, to which a cord N connects, such cord being extended and connected with a grip-lever O on handle of lever J, so the pawl may be conveniently operated into engagement with the ratchet when desired to wind the machine, which may be easily effected by operating the lever J, as will be understood from Fig. 4 of the drawings.

We desire it understood that we do not wish to be limited in the broad principles of our invention to the described construction of winding mechanism.

Having thus described our invention, what we claim as new is—

1. In a spring-motor, the combination of the framing, the gear-train therein having a power-shaft, the spring-arms secured at one end to the framing, extended thence downward on opposite sides of the gear-train, cords or connections between said free ends and the power-shaft, and guides for said cords or connections, substantially as set forth.

2. In a spring-motor, the combination of the framing, a spring-arm secured at one end to the framing and adapted at its other end to be connected with the power-shaft, and the auxiliary spring-arm secured at one end to the framing and arranged at its free end to bear against the first spring-arm between the ends of the latter, substantially as set forth.

3. In a motor, the combination of the framing, the power-shaft, the spring-arms arranged on opposite sides of the power-shaft, secured at one end to the framing, and having their free ends arranged opposite each other, such free ends being movable inward toward each other and outward apart, and connections between said free ends and the power-shaft, substantially as set forth.

4. The improved spring-motor, substantially as described, comprising the framing, the power-shaft therein, the guide-pulleys F and G below such power-shaft, the spring-arms B, arranged on opposite sides of such shaft and pulleys, connections between the free ends of springs B and the power-shaft, such connections being disposed around pulleys F and G, and the auxiliary springs B', secured at one end to the framing and bearing at their opposite or free ends against the inner sides of the spring-arms B at about the centers of such arms, substantially as set forth.

5. In a spring-motor, the combination, with the power-shaft, the springs connected with such shaft, and the ratchet-wheel M, of the lever J, the link or bar K, connected with lever J, the pawl pivoted to bar K and arranged to engage the wheel M, the spring for holding such pawl normally out of such engagement, and the cord or connection by which the pawl may be drawn into engagement with the wheel M, substantially as and for the purpose specified.

6. In a spring-motor, the combination, with the framing and the spring-arm B, secured at one end to such framing, of the auxiliary spring-arm secured at one end rigidly to the framing, provided at its free end with an anti-friction roller, and arranged at such end to engage and bear against the spring-arm B at about the middle thereof, substantially as set forth.

7. The combination, in a spring-motor, of the framing, the power-shaft, the guide-pulleys F and G, a spring bar or bars secured at one end rigidly to the framing, and a connecting cord or cords extended between the power-shaft and the free end of the spring or springs, substantially as set forth.

LUDWIG MELCHIOR.
GEORGE HAAS.

Witnesses:
JAMES T. GRUBB,
JOHN H. PINKERTON.